United States Patent
Thomas et al.

(10) Patent No.: US 10,754,833 B2
(45) Date of Patent: Aug. 25, 2020

(54) COMBINED DATABASE MIGRATION AND STRUCTURE CONVERSION WITHIN MAINTENANCE PROCEDURES

(71) Applicant: SAP SE, Walldorf (DE)

(72) Inventors: Florian Thomas, Schifferstadt (DE); Christiane Valentin, Malsch (DE); Joerg Schoen, Nussloch (DE); Stefan Krebs, Mannheim (DE)

(73) Assignee: SAP SE, Walldorf (DE)

( * ) Notice: Subject to any disclaimer, the term of this patent is extended or adjusted under 35 U.S.C. 154(b) by 309 days.

(21) Appl. No.: 15/416,125

(22) Filed: Jan. 26, 2017

(65) Prior Publication Data

US 2018/0210880 A1  Jul. 26, 2018

(51) Int. Cl.
*G06F 16/21* (2019.01)
*G06F 16/25* (2019.01)

(52) U.S. Cl.
CPC .......... *G06F 16/214* (2019.01); *G06F 16/258* (2019.01)

(58) Field of Classification Search
CPC .... G06F 16/214; G06F 16/258; G06F 16/199; G06F 16/122; G06F 16/185

USPC ........................................................ 707/609
See application file for complete search history.

(56) References Cited

U.S. PATENT DOCUMENTS

| | | | |
|---|---|---|---|
| 7,283,985 B2 | 10/2007 | Schauerte et al. | |
| 7,523,142 B2 | 4/2009 | Driesen et al. | |
| 7,620,665 B1* | 11/2009 | George | G06F 16/214 |
| 8,479,187 B2 | 7/2013 | Driesen et al. | |
| 9,086,940 B2 | 7/2015 | Weckwerth et al. | |
| 2014/0201146 A1* | 7/2014 | Kapsiar | G06F 16/119 |
| | | | 707/635 |
| 2015/0006476 A1* | 1/2015 | Engelko | G06F 16/214 |
| | | | 707/609 |
| 2015/0019487 A1* | 1/2015 | Buehne | G06F 16/2379 |
| | | | 707/632 |

* cited by examiner

*Primary Examiner* — Hares Jami
(74) *Attorney, Agent, or Firm* — Fish & Richardson P.C.

(57) ABSTRACT

Methods, systems, and computer-readable storage media for data migration in an upgrade procedure executed on a software system include actions of initiating the upgrade procedure, determining a first set of tables of a source database that include data to be converted before being first written to a target database, converting data of the first set of tables to provide first converted data, and writing the converted data to one or more tables in the target database.

18 Claims, 4 Drawing Sheets

COMBINED DATABASE MIGRATION AND STRUCTURE CONVERSION WITHIN MAINTENANCE PROCEDURES

BACKGROUND

Entities, such as software developers and/or vendors, provide software and services. Example software can include enterprise software. In some examples, enterprise software can include application software (an application) that interacts with one or more databases. For example, an application can be hosted on one or more application servers, and a user can interact with the application using a client device. In some examples, user interaction can result in data being read from, written to, and/or modified within one or more databases.

During a lifecycle of the application and/or database, one or more maintenance operations may be required. Example maintenance operations include upgrading, configuring, patching, and testing. In an upgrade procedure, for example, an application can be upgraded (e.g., from a first version to a second version), and data can be migrated between databases (e.g., from a first database that operated with the first version of the application to a second database that is to operate with the second version). Traditionally, updating software and migrating databases usually are executed as separate steps, leading to multiple downtimes (e.g., periods during which the application and/or databases are unavailable for production use).

Products have been developed, which combine the upgrade and migration, such that a single downtime is required. Such products, however, have certain drawbacks. For example, the data is first migrated in the structure of the original system, but, due to the integrated software update, the data structure changes from a source structure to a target structure, which results in structural changes of the tables. The structural changes are applied after the data migration. Database indexes are also affected, because they have to be updated in the same way as the data is updated during such a conversion. Overall, and even though only a single downtime is required, this integrated conversion process results in a relatively extensive downtime, and can require significant technical resources (e.g., memory consumption due to data duplication).

SUMMARY

Implementations of the present disclosure include computer-implemented methods for combined upgrade and data migration in an upgrade procedure executed on a software system. In some implementations, actions include initiating the upgrade procedure, determining a first set of tables of a source database that include data to be converted before being first written to a target database, converting data of the first set of tables to provide first converted data, and writing the converted data to one or more tables in the target database. Other implementations of this aspect include corresponding systems, apparatus, and computer programs, configured to perform the actions of the methods, encoded on computer storage devices.

These and other implementations can each optionally include one or more of the following features: determining the first set of tables of the source database includes comparing a source name table to a target name table, the source name table providing table and field definitions that are activated in the source database, and the target name table providing table and field definitions that are to be activated in the target database; actions further include determining a second set of tables of a source database that include data that is to be written to the target database before being converted; actions further include writing data of the second set of tables to the target database, reading the data of the second set of tables from the target database to convert the data, and provide second converted data, and writing the second converted data to the target database; the first converted data includes at least one attribute that is different than at least one respective attribute of the data of the first set of tables; converting data of the first set of tables to provide first converted data is based on a source structure file, and a target structure file; and the one or more tables in the target database correspond to respective tables in the first set of tables.

Implementations of the present disclosure provide one or more of the following example advantages. For example, implementations of the present disclosure reduce the runtime of the upgrade procedure, and in so doing, reduce downtime of the system, and reduce technical resource consumption (e.g., on the database, and system level). For example, reduction in the number of read/write accesses to the database is achieved, as well as an overall reduction in network traffic.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to improved maintenance procedures in software systems. More particularly, implementations of the present disclosure are directed to combined upgrade and data migration in an upgrade procedure executed on a software system. In some implementations, actions include initiating the upgrade procedure, determining a first set of tables of a source database that include data to be converted before being first written to a target database, converting data of the first set of tables to provide first converted data, and writing the converted data to one or more tables in the target database.

Figure 1:
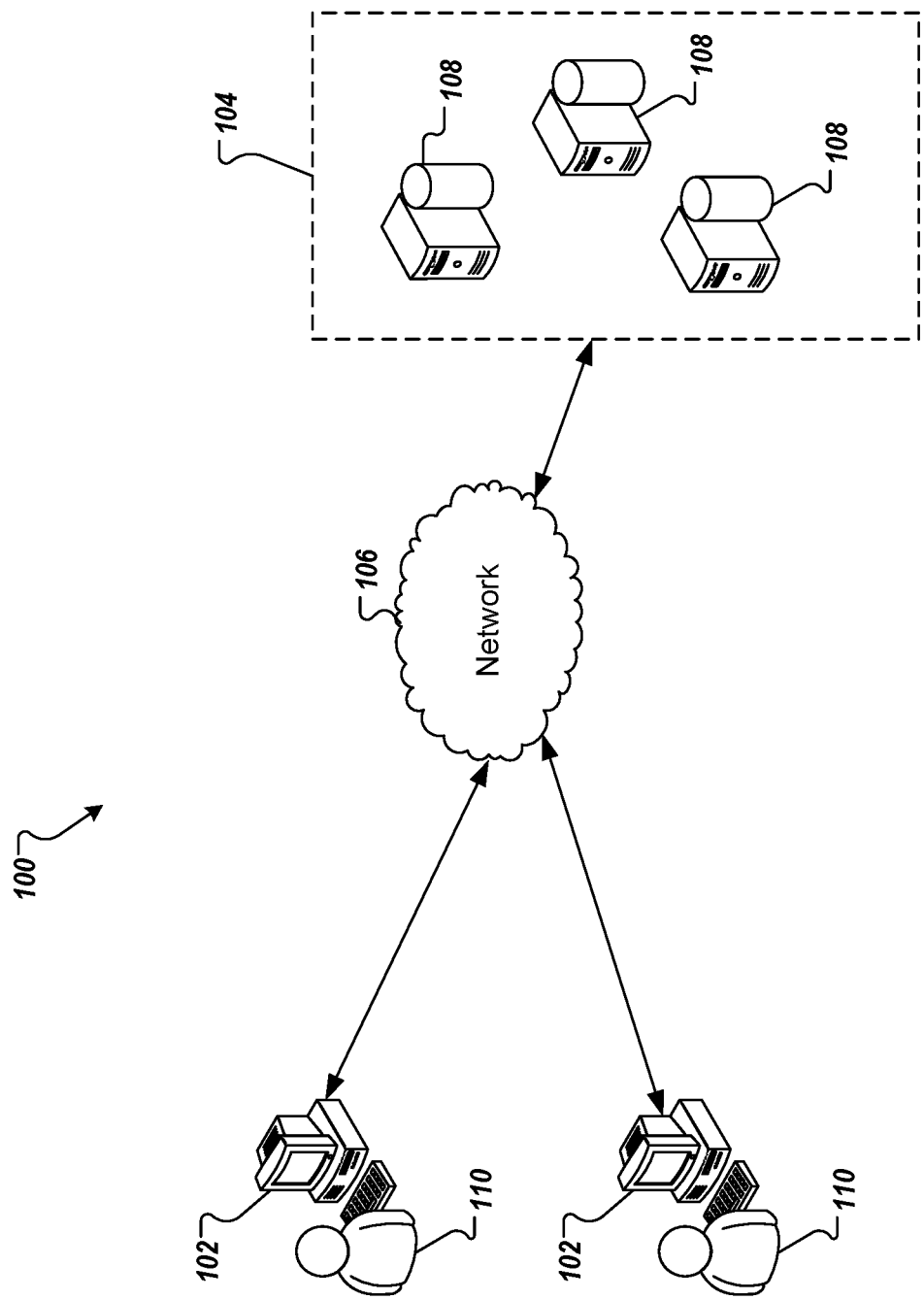
FIG. 1 depicts an example high-level architecture in accordance with implementations of the present disclosure.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 110 can include a user, who interacts with an application that is hosted by the server system 104. In another example context, a user 110 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices (e.g., the client devices 102) over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors (e.g., central processing units (CPUs)), over a memory bus. An in-memory database can be contrasted with database management systems that employ a disk storage mechanism. In some examples, in-memory databases are faster than disk storage databases, because internal optimization algorithms can be simpler and execute fewer CPU instructions (e.g., reduced CPU consumption). In some examples, accessing data in an in-memory database eliminates seek time when querying the data, which provides faster and more predictable performance than disk-storage databases.

Implementations of the present disclosure are described in further detail herein with reference to an example context. The example context includes applications that are executed on a client-server architecture, such as the example architecture 100 of FIG. 1. In some examples, applications can be provided in a suite that includes two or more applications. Example applications can include an enterprise resource planning (ERP) application, a customer relationship management (CRM) application, a supply chain management (SCM) application, and a product lifecycle management (PLM) application. It is contemplated, however, that implementations of the present disclosure can be realized in any appropriate context (e.g., healthcare applications).

Referring again to FIG. 1, and in the example context, one or more applications can be hosted by the server system 104. A user 110 can interact with an application using the client device 102. More specifically, a session can be established between the client device 102 and one or more server devices 104, during which session the user 110 is able to interact with one or more applications hosted on the server system 104. The one or more applications can enable the user to interact with data stored in one or more databases. In some examples, interactions can result in data being stored to the database, deleted from the database, and/or edited within the database.

In some implementations, applications and/or databases undergo lifecycle management. In some examples, lifecycle management includes executing one or more maintenance procedures for an application and/or a database. Example maintenance procedures can include an upgrade procedure, a patch procedure, a configuration procedure, and development and testing procedures. Implementations of the present disclosure will be described in further detail herein with reference to an upgrade procedure.

An example upgrade procedure can include updating software. For example, an application can be updated from a first version (e.g., V1) to a second version (e.g., V2). Example updates can include adding functionality to the application, and/or structural changes to one or more tables stored in one or more databases. As another example, a database can be updated from a first version (e.g., V1) to a second version (e.g., V2). Example updates can include updating a data schema of the database, which can involve structural changes to one or more tables. In some examples, a data schema (also referred to as database schema) is a data structure that defines how data is to be stored in the database. In some examples, the databases schema can be defined in a formal language that is supported by a database management system (DBMS). In general, a data schema can be described as a catalog that specifies all database objects that can be stored in the database. In some examples, different data schemas (e.g., V1 versus V2) can have different objects with the same object name, but different structures.

To provide further context for implementations of the present disclosure, and as introduced above, products have been developed, which combine the upgrade and migration, such that a single downtime is required. An example product includes the SAP Software Update Manager (SUM) provided by SAP SE of Walldorf, Germany. Such products, however, first migrate the data in the source structure of the original system, then change the source structure to a target structure in the database, after the migration.

By way of example, the number 123 in a NUMC field (e.g., character string consisting only of the digits 0 through 9) with length 5 is stored as "00123" in a table of a database. In this example, NUMC is an SAP/ABAP-specific data type. If the NUMC field of length 5 is to be extended to a NUMC field with length 8, three leading zeros have to be added to each character string. Continuing with the example above, the number would be stored as "00000123." In a traditional combined upgrade and migration, the data is (1) read from the source database as "00123," (2) is written to the target database as "00123." In a later step, the data is (3) read into memory again, (4) is converted into the target format "00000123," and (5) is written back to the target database. Overall, and even though only a single downtime is required, this integrated conversion process results in a relatively extensive downtime, and can require significant technical resources (e.g., memory consumption due to data duplication).

In view of the above context, implementations of the present disclosure provide combined upgrade and data migration in an upgrade procedure executed on a software system. More particularly, implementations of the present disclosure combine the data migration and conversion of the data structure in one step within an update and migration tool. An example tool includes the Database Migration Option (DMO) of SAP SUM, referenced above. In accordance with implementations of the present disclosure, the data is read from the source database in the source structure, is converted to the target structure within the migration tool, and is written to the target database in the target structure. In some implementations, the database indexes are created in the target structure and are written to the target database in the target structure.

Accordingly, implementations of the present disclosure enhance the data migration tool to enable the data migration tool to perform the structure conversion on the database level. Further, implementations of the present disclosure enhance the upgrade and migration control tool to handle the table lifecycle, such that tables are created in the target database in the target structure before the data migration, and are not changed/modified after the data migration.

Figure 2:
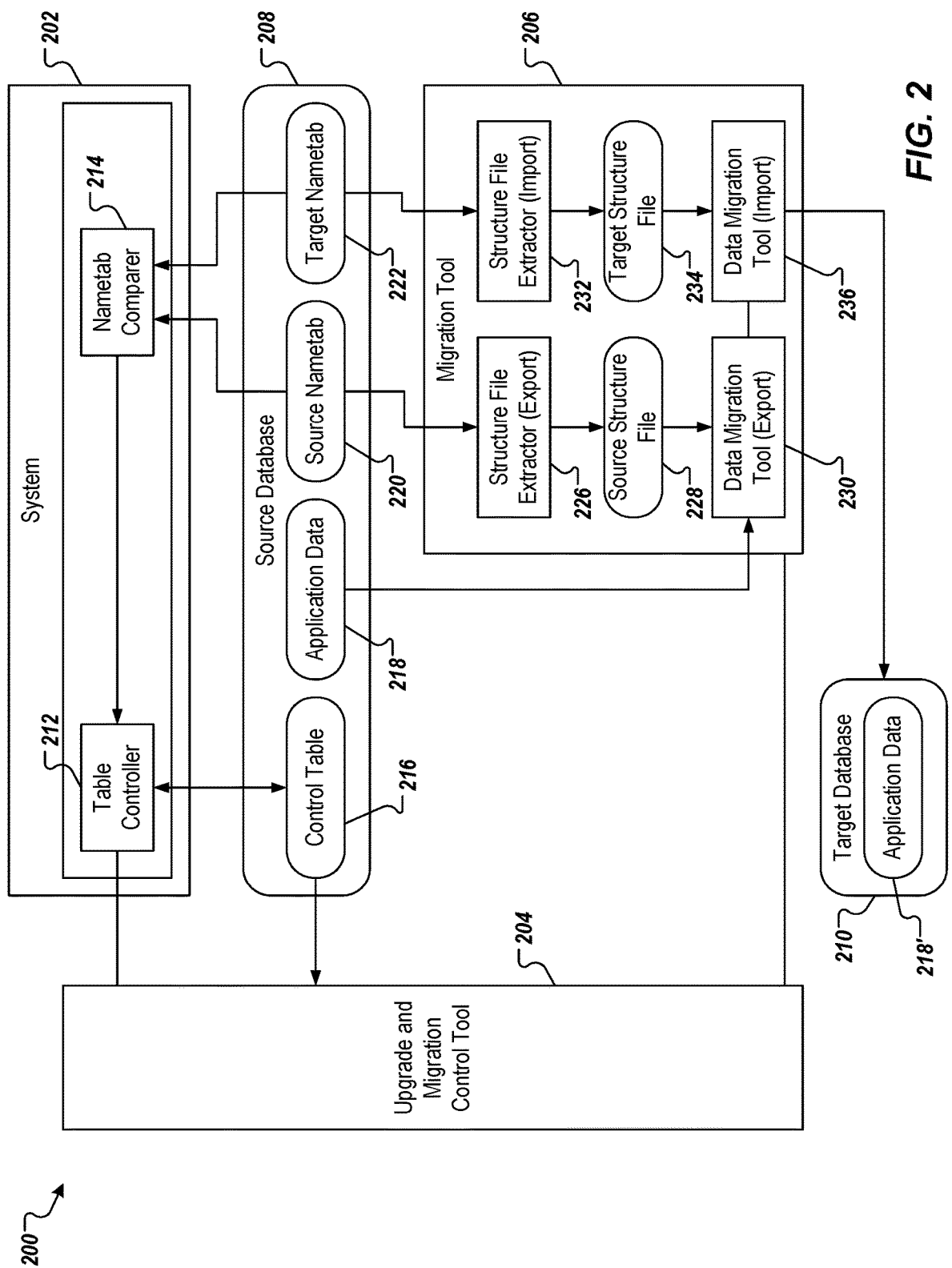
FIG. 2 depicts an example component architecture in accordance with implementations of the present disclosure.

FIG. 2 depicts an example component architecture 200 in accordance with implementations of the present disclosure. In the depicted example, the component architecture 200 includes a system 202, an upgrade and migration control tool 204, a migration tool 206, a source database 208, and a target database 210. The system 202 includes a table controller 212, and a name table (nametab) comparer 214. In some examples, a nametab (also referred to as a runtime object) contains the table and field definitions that are activated in the system. In the depicted example, the migration tools 206 include an exporting structure file extractor 226, a source structure file 228, an exporting data migration tool 230, an importing structure file extractor 232, a target structure file 234, and an importing data migration tool 230. In some examples, one or more of the components of the example component architecture 200 are provided as one or more computer-executable programs executed using one or more computing devices.

In the depicted example, the source database 208 includes a control table 216, application data 218, a source nametab 220, and a target nametab 222. In some examples, the application 218 of the source database 208 is to be migrated to the target database 210 as application data 218'. In accordance with implementations of the present disclosure, and as described in further detail herein, at least a portion of the application data 218 is converted before being first written to the target database 210. For example, the source nametab 220 contains the table and field definitions that are activated in the source database 208 before the upgrade procedure is performed, and the target nametab 222 contains the table and field definitions that are to be activated in the target database 210 as a result of the upgrade procedure.

In accordance with implementations of the present disclosure, the nametab comparer 214 identifies tables that are to be changed as part of the upgrade procedure. For example, if a field of a table is to be changed as part of the upgrade procedure (e.g., from NUMC with string length of 5 to NUMC with string length of 8), the table is identified as a table that is to be changed through the upgrade procedure. As noted above, the nametab holds information about table fields, data types, and field lengths. The nametab is used by the system runtime to obtain information on how to access database objects. The source nametab 220 holds information about the database table as it is on the source database 208, and the target nametab 222 holds information about the database table as it should be on the target database 210.

In some implementations, the nametab comparer 214 reads the source nametab 220, and the target nametab 222 from the source database, and compares them to determine whether data of at least one table can be converted by the data migration tools 206, before being first written to the target database 210. In some examples, the nametab comparer 214 provides a set of tables to the table controller 212. In some examples, the set of tables includes unique table identifiers of one or more tables that have data that can be converted. In some examples, the table controller 212 provides the set of tables to the control table 216, which provides the set of tables to the upgrade and migration control tool 204.

In further detail, during an upgrade procedure, there is a set of tables that is write-protected in the source database 208. Consequently, migrating write-protected tables can be performed during the uptime of the upgrade procedure, and with the subsequent period of downtime can be reduced. In some examples, copies of the write-protected tables can be generated, and the copies can be converted to the target structure. In some examples, the table controller 212 determined which tables can be handled in this manner. That is, the table controller 212 decides which tables are migrated at which point in time of the migration (e.g., uptime, downtime). In some examples, the table controller 212 also controls the handling of a set of tables for an additional system, which can be referred to as a "shadow system." In some examples, the shadow system is used to calculate a delta between the first version V1 and the second version V2 of an upgrade, and prepare parts of the later target system. The tables of this shadow system have different types. For example, some tables are only used to run the system and are deleted after the processing is finished, while other tables hold the results of the calculation and have to be kept. Consequently, the table controller 212 can decide how each table is handled with regard to a shadow system. In some examples, the control table 216 is the storage for the results of the table controller 216 (e.g., stores indications as to how respective tables are to be handled as determined by the table controller 212). The control table 216 is read by the upgrade and migration control tool 204.

In some implementations, the upgrade and migration control tool 204 regulates operation of the migration tool 206 to perform the data migration of the upgrade procedure. For example, the upgrade and migration control tool informs the migration tools, as to which tables include data that is to be converted, as part of the migration process (e.g., provides the set of tables to the migration tool 206).

In accordance with implementations of the present disclosure, the migration tool 206 includes data conversion that can be executed to convert data of tables of the set of tables before being first written to the target database 210. In some examples, information about the table structure is extracted from the respective nametab (e.g., the source nametab 220, the target nametab 222), and is written to a structure file (e.g., the source structure file 228, the target structure file 234) by the respective structure file extractor (e.g., the exporting structure file extractor 226, the importing structure file extractor 232).

In some examples, the source structure file 228, and the target structure file 234 hold (in parts) the same information as the nametab 220, and the nametab 222, respectively. However, the information is in a format that is consumable by the respective data migration tools 230, 236. In some examples, the information is stored in a file, and as such can be read without direct access to the nametabs, and/or the source database 208. In some examples, there can be scenarios, in which the application data 218 is exported and then also written into a data file first. With the structure files and the data file, it is possible to import the data to the target database 210 just from files, without access to the source database 208. This can be useful for datacenter moves where there is no direct or only slow connection between the source database 208, and the target database 210, for example.

In some implementations, the exporting data migration tool 230 receives the application data 218 that is to be written to the target database 210, and adds information about the table structure to a data file/stream, which includes the source structure file 228. In some implementations, the importing data migration tool 236 reads the data file/stream, and compares the structure (e.g., provided in the source structure file 228) of each source table provided by the exporting data migration tool 230, and the target structure described in the target structure file 234. For tables that have been indicated as involving a data structure change, the importing data migration tool 236 converts the data to the target structure before importing the data to the target database 210.

In accordance with implementations of the present disclosure, the data of less than all tables being migrated is converted prior to writing the data to the target database 210. In other words, it can occur that at least some data is first written to the target database 210 before being converted (e.g., using a traditional combined upgrade and migration procedure, which can be referred to as regular conversion). For example, if the source database 208 includes 20 tables, it can be determined that data of 19 tables of the 20 tables (e.g., 95% of the tables) include data that is to be converted before being first written to the target database 210, and is processed in accordance with implementations of the present disclosure. The data of the remaining table is processed using the regular conversion (e.g., first written to the target database 210, then read from the target database 210 into memory, converted in-memory, and written back to the target database 210).

In accordance with implementations of the present disclosure, and to ensure that the data already converted in accordance with the present disclosure is not again processed through the regular conversion (e.g., data of the 19 tables is not processed using the regular conversion process that the data of the 1 table is converted with). In some implementations, the table controller 212 provides instructions to ensure that already processed (converted) data that has been written to the target database 210 is not again processed through a regular conversion, if any. In some examples, and as discussed above, the control table 216 includes an entry for each table that is to be changed by the regular conversion. In some examples, for each table that has already undergone conversion, the respective entry is removed form the control table 216.

To highlight advantages of implementations of the present disclosure, the above-discussed example of the number 123 with length 5 (e.g., stored as "00123" in a table of a database), and extending to length 8 during an upgrade procedure (e.g., stored as "00000123") can again be considered. In accordance with implementations of the present disclosure, the combined upgrade and migration can include that the data is (1) read from the source database as "00123," (2) is converted into the target format "00000123," and (3) is written to the target database. In this manner, steps (2) and (3) of the above-described traditional combined upgrade and migration are foregone. Consequently, implementations of the present disclosure obviate writing data to the target database, and reading the data from the target database to perform the conversion in-memory, thereby reducing (significantly) resources consumption (e.g., processors, memory), as well as the overall downtime required.

Figure 3:
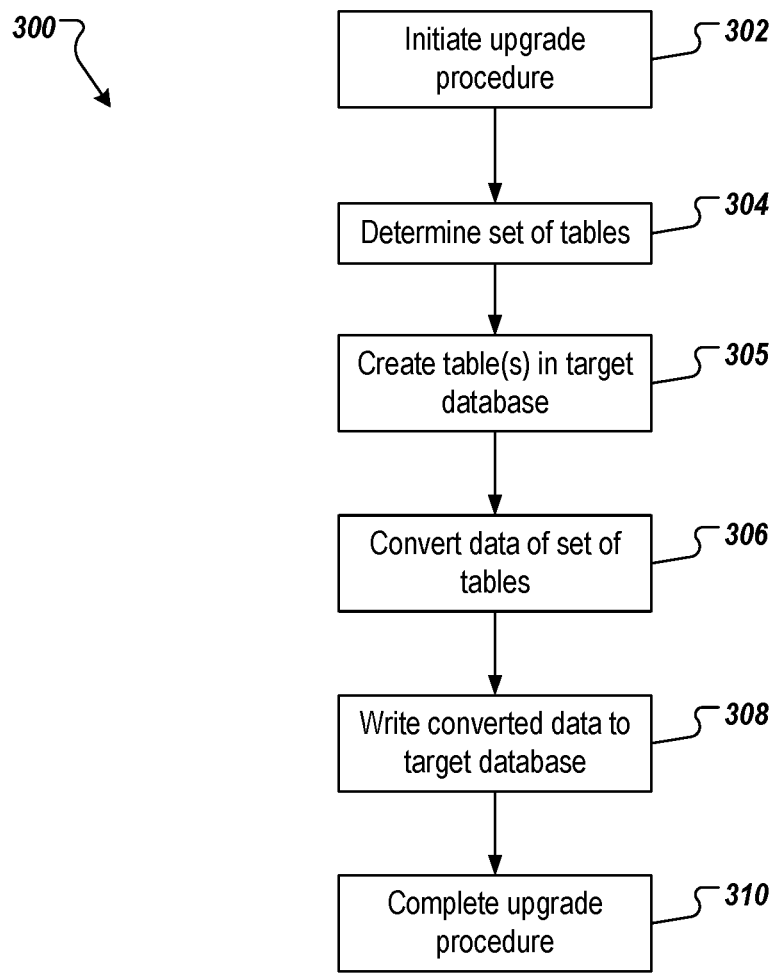
FIG. 3 depicts an example process that can be executed in accordance with implementations of the present disclosure.

FIG. 3 depicts an example process 300 that can be executed in accordance with implementations of the present disclosure. In some examples, the example process 300 can be provided by one or more computer-executable programs executed using one or more computing devices. In some examples, the example process 300 is executed for combined upgrade and data migration in an upgrade procedure executed on a software system.

The upgrade procedure is initiated (302). For example, the upgrade procedure is initiated by a user (e.g., through the upgrade and migration control tool 204). A set of tables is determined (304). In some examples, the set of tables includes one or more tables of a source database, each table including data that is to be converted before being written to a target database. For example, and as described herein, the structures of one or more tables in the source database can be compared to the structures of respective tables in the target database to determine structural differences and respective transformations for converting data, as described herein (e.g., the nametab comparer 214 comparing the source nametab 220 and the target nametab 222). With reference to the example provided above, it can be determined that a field in a source table is a NUMC field with string length of 5, and a respective field in a target table is NUMC with string length of 8. Consequently, a transformation is provided to add leading zeros, for example, to data of the source table that populates the field, before being written to the respective target table.

Tables of the set of tables are created in the target database (305). For example, each table in the set of tables is created in the target database, corresponding to respective tables of the source database. The tables of the target database include respective target table structure(s) (e.g., different from table structures of the respective source tables). Data of the set of tables is converted (306). For example, and as described herein, at least a portion of the data of the source database (e.g., the application data 218) is read into memory (e.g., RAM), one or more transformations are executed over the data to convert the data in-memory, before being written to the target database. In this manner, converted data is provided (e.g., NUMC with string length 8 instead of string length 5). The converted data is written to the target database (308). For example, the converted data is written to respective fields of the tables created in the target database. The upgrade procedure is completed (310). For example, respective indices of tables of the target database are created, and the target database is switched to production use (e.g., applications previously reading from/writing to the source database, read from/write to the target database).

Figure 4:
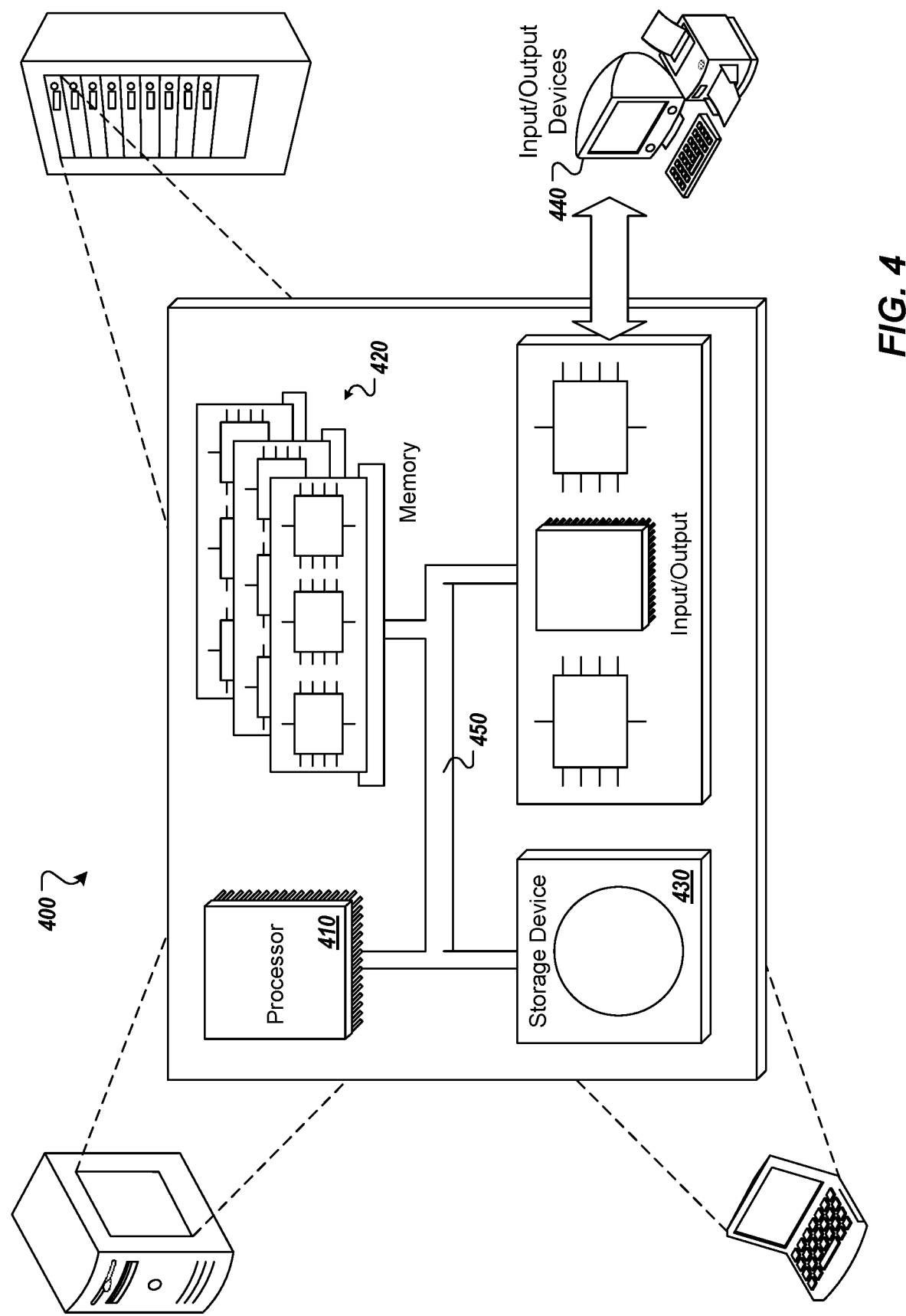
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device), for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include (e.g., a LAN, a WAN), and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for data migration in an upgrade procedure executed on a software system, the method being executed using one or more processors and comprising:

initiating, by the one or more processors, the upgrade procedure;

receiving, by an import data migration tool of a migration tool and from an export data migration tool of the migration tool, a first set of tables of a source database and table structure information, the export data migration tool providing the table structure information from a source structure file generated by an export structure file extractor of the migration tool based on a source name table provided from the source database;

determining, by the import data migration tool, that the first set of tables includes data to be converted from a source data structure before being first written to a target database, determining comprising reading the data of the first set of tables and the table structure information, and comparing the source data structure to a target data structure provided in a target structure file received by the import data migration tool, the target structure file generated by an import structure file extractor of the migration tool based on a target name table provided from the source database;

converting, by the import data migration tool, data of the first set of tables to provide first converted data, the first converted data comprising the target data structure that is different from the source data structure; and writing the first converted data to one or more tables in the target database, wherein, during writing, a control tool regulates operation of the migration tool using a control table to inform the migration tool as to which tables include data that is to be converted, the control table being generated based on comparing the source name table and the target name table, and an entry of the control table being removed from the control table in response to conversion of data of a respective table.

2. The method of claim 1, wherein determining the first set of tables of the source database comprises comparing the source name table to the target name table, the source name table providing table and field definitions that are activated in the source database, and the target name table providing table and field definitions that are to be activated in the target database.

3. The method of claim 1, further comprising determining a second set of tables of the source database that include data that is to be written to the target database before being converted.

4. The method of claim 3, further comprising:
writing data of the second set of tables to the target database;
reading the data of the second set of tables from the target database to convert the data, and provide second converted data; and
writing the second converted data to the target database.

5. The method of claim 1, wherein the first converted data comprises at least one attribute that is different than at least one respective attribute of the data of the first set of tables.

6. The method of claim 1, wherein the one or more tables in the target database correspond to respective tables in the first set of tables.

7. A non-transitory computer-readable storage medium coupled to one or more processors and having instructions stored thereon which, when executed by the one or more processors, cause the one or more processors to perform operations for data migration in an upgrade procedure executed on a software system, the operations comprising:
initiating the upgrade procedure;
receiving, by an import data migration tool of a migration tool and from an export data migration tool of the migration tool, a first set of tables of a source database and table structure information, the export data migration tool providing the table structure information from a source structure file generated by an export structure file extractor of the migration tool based on a source name table provided from the source database;
determining, by the import data migration tool, that the first set of tables includes data to be converted from a source data structure before being first written to a target database, determining comprising reading the data of the first set of tables and the table structure information, and comparing the source data structure to a target data structure provided in a target structure file received by the import data migration tool, the target structure file generated by an import structure file extractor of the migration tool based on a target name table provided from the source database;
converting, by the import data migration tool, data of the first set of tables to provide first converted data, the first converted data comprising the target data structure that is different from the source data structure; and
writing the first converted data to one or more tables in the target database, wherein, during writing, a control tool regulates operation of the migration tool using a control table to inform the migration tool as to which tables include data that is to be converted, the control table being generated based on comparing the source name table and the target name table, and an entry of the control table being removed from the control table in response to conversion of data of a respective table.

8. The computer-readable storage medium of claim 7, wherein determining the first set of tables of the source database comprises comparing the source name table to the target name table, the source name table providing table and field definitions that are activated in the source database, and the target name table providing table and field definitions that are to be activated in the target database.

9. The computer-readable storage medium of claim 7, wherein operations further include determining a second set of tables of the source database that include data that is to be written to the target database before being converted.

10. The computer-readable storage medium of claim 9, wherein operations further include:
writing data of the second set of tables to the target database;
reading the data of the second set of tables from the target database to convert the data, and provide second converted data; and
writing the second converted data to the target database.

11. The computer-readable storage medium of claim 7, wherein the first converted data comprises at least one attribute that is different than at least one respective attribute of the data of the first set of tables.

12. The computer-readable storage medium of claim 7, wherein the one or more tables in the target database correspond to respective tables in the first set of tables.

13. A system, comprising:
a computing device; and
a computer-readable storage device coupled to the computing device and having instructions stored thereon which, when executed by the computing device, cause the computing device to perform operations for data migration in an upgrade procedure executed on a software system, the operations comprising:
initiating the upgrade procedure;
receiving, by an import data migration tool of a migration tool and from an export data migration tool of the migration tool, a first set of tables of a source database and table structure information, the export data migration tool providing the table structure information from a source structure file generated by an export structure file extractor of the migration tool based on a source name table provided from the source database;
determining, by the import data migration tool, that the first set of tables includes data to be converted from a source data structure before being first written to a target database, determining comprising reading the data of the first set of tables and the table structure information, and comparing the source data structure to a target data structure provided in a target structure file received by the import data migration tool the target structure file generated by an import structure file extractor of the migration tool based on a target name table provided from the source database;

converting, by the import data migration tool, data of the first set of tables to provide first converted data, the first converted data comprising the target data structure that is different from the source data structure; and writing the first converted data to one or more tables in the target database wherein, during writing, a control tool regulates operation of the migration tool using a control table to inform the migration tool as to which tables include data that is to be converted, the control table being generated based on comparing the source name table and the target name table, and an entry of the control table being removed from the control table in response to conversion of data of a respective table.

14. The system of claim 13, wherein determining the first set of tables of the source database comprises comparing the source name table to the target name table, the source name table providing table and field definitions that are activated in the source database, and the target name table providing table and field definitions that are to be activated in the target database.

15. The system of claim 13, wherein operations further include determining a second set of tables of the source database that include data that is to be written to the target database before being converted.

16. The system of claim 15, wherein operations further include:

writing data of the second set of tables to the target database;

reading the data of the second set of tables from the target database to convert the data, and provide second converted data; and writing the second converted data to the target database.

17. The system of claim 13, wherein the first converted data comprises at least one attribute that is different than at least one respective attribute of the data of the first set of tables.

18. The system of claim 13, wherein the one or more tables in the target database correspond to respective tables in the first set of tables.

* * * * *